US012639393B2

(12) United States Patent
Mcnamara et al.

(10) Patent No.: US 12,639,393 B2
(45) Date of Patent: May 26, 2026

(54) SYSTEMS AND METHODS FOR GENERATING INTRANET WEBSITES

(71) Applicant: JPMORGAN CHASE BANK, N.A., New York, NY (US)

(72) Inventors: Kevin J Mcnamara, Newfoundland, NJ (US); Preeti Gupta, Plano, TX (US); Dejan Savic, Burleson, TX (US); Mario Macias, Plano, TX (US); Elizabeth Park, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/890,478

(22) Filed: Sep. 19, 2024

(65) Prior Publication Data

US 2026/0080027 A1 Mar. 19, 2026

(51) Int. Cl.
G06F 16/958 (2019.01)
G06F 16/953 (2019.01)

(52) U.S. Cl.
CPC .......... G06F 16/958 (2019.01); G06F 16/953 (2019.01)

(58) Field of Classification Search
CPC ........................... G06F 16/958; G06F 16/953
See application file for complete search history.

(56) References Cited

U.S. PATENT DOCUMENTS

| | | | | |
|---|---|---|---|---|
| 7,966,369 B1* | 6/2011 | Briere | .................... | H04L 67/52 |
| | | | | 709/204 |
| 8,849,693 B1* | 9/2014 | Koyfman | ............... | G06Q 30/02 |
| | | | | 705/14.1 |
| 9,349,016 B1* | 5/2016 | Brisebois | ............... | H04L 63/20 |
| 9,501,744 B1* | 11/2016 | Brisebois | ............ | G06N 5/048 |
| 10,157,358 B1* | 12/2018 | Brisebois | .......... | G06Q 10/1093 |
| 2005/0165889 A1* | 7/2005 | Muret | .................... | G06Q 30/06 |
| | | | | 709/203 |
| 2013/0246303 A1* | 9/2013 | Finck | .................... | G06Q 40/06 |
| | | | | 705/36 R |
| 2014/0108373 A1* | 4/2014 | Abrahami | .......... | G06F 16/9566 |
| | | | | 707/706 |
| 2015/0278363 A1* | 10/2015 | Briere | ............... | G06F 16/24578 |
| | | | | 707/710 |
| 2016/0203422 A1* | 7/2016 | Demarchi | ............... | G06F 16/29 |
| | | | | 705/6 |
| 2018/0247268 A1* | 8/2018 | Vanasco | ................. | G06Q 50/01 |

(Continued)

*Primary Examiner* — Mark E Hershley
(74) *Attorney, Agent, or Firm* — GREENBERG TRAURIG LLP

(57) ABSTRACT

Methods and systems consistent with the disclosure include a method for generating a website, comprising: receiving, by a computer program executed on an electronic device, a request for a website; generating, by the computer program, a formatted request for the website to a microservice hub; identifying, by the microservice hub, one or more template parts based on the formatted request; determining, by the microservice hub, a site specific data to retrieve and sending a call to a site specific database for the site specific data; determining, by the microservice hub, a prompt to query a first machine learning engine based on an internal or external information content of the one or more template parts to fulfill a one or more prompts based on at least one template parts; and rendering, by the microservice hub, the website based on the prompts and the one or more template parts.

20 Claims, 4 Drawing Sheets

(56) References Cited

U.S. PATENT DOCUMENTS

| | | | |
|---|---|---|---|
| 2018/0336175 A1* | 11/2018 | Heie | G06F 40/186 |
| 2019/0107548 A1* | 4/2019 | Bohnsack | G06Q 10/087 |
| 2021/0056762 A1* | 2/2021 | Robbe | G06F 16/2282 |
| 2022/0019740 A1* | 1/2022 | Meyerzon | G06F 16/313 |
| 2022/0129509 A1* | 4/2022 | Yu | G06F 16/958 |
| 2023/0214925 A1* | 7/2023 | Cella | G06Q 30/06 |
| | | | 705/37 |
| 2024/0037443 A1* | 2/2024 | You | G06F 16/953 |
| 2024/0070434 A1* | 2/2024 | Garg | G06N 3/0455 |
| 2024/0386197 A1* | 11/2024 | Perez | G06F 16/958 |
| 2025/0045256 A1* | 2/2025 | Gottlob | G06F 16/2365 |
| 2025/0110975 A1* | 4/2025 | Shea | G06F 16/3329 |

* cited by examiner

Receive user request (310)

Generate request for website (320)

Identify/gather Template Parts (330)

Fetch site specific data and/or template (340)

Determine which information to request from first machine learning engine (internal) and second machine learning engine (external) (350)

Request content for template parts from first and second machine learning engines (360)

Render website (370)

300

SYSTEMS AND METHODS FOR GENERATING INTRANET WEBSITES

BACKGROUND OF THE INVENTION

1. Field of the Invention

Embodiments relate to systems and methods for generating personalized intranet websites.

2. Description of the Related Art

Creating intranet websites is a long and tedious process, and the result is not tailored to the audience. Significant infrastructure and workforce from multiple disparate areas of accompany are required to create intranet websites. Many existing services fail to leverage strategic public cloud offerings. Additionally, maintenance and ongoing support of services create significant burdens on companies. There is a need for systems and processes to efficiently create intranet websites that are tailored, are capable of efficiently managing and pulling data from multiple areas, use cloud resources, and reduce or eliminate the need for excessive manual inputs.

Current systems are reliant on centralized data so that when an intranet or technology infrastructure is breached, an attacker has access to an entire internal network. This can also make malware attacks more dangerous because of the access to central data repositories. The large amount of data required for current systems is also cumbersome to update and to ensure compliance for. There is a need for improved website creation systems that rely on original data sources and that are created for a single website request, and thus do not require a central repository that is subject to attack. There is also a need to reduce the large amount of centrally stored data and to more easily update and ensure compliance for.

SUMMARY

Embodiments relate to systems and methods for generating websites. Methods and systems consistent with the disclosure include a method for generating a website, comprising: receiving, by a computer program executed on an electronic device, a request for a website; generating, by the computer program, a formatted request for the website to a microservice hub; identifying, by the microservice hub, one or more template parts based on the formatted request; determining, by the microservice hub, a site data to retrieve and sending a call to a site database for the site data; determining, by the microservice hub, a first content to query from a first machine learning engine based on an internal information content of the one or more template parts to fulfill a first prompt based on at least one template part and a second content to query from a second machine learning engine based on an external information content of the one or more template parts to fulfill a second prompt based on the at least one template part; and rendering, by the microservice hub, the website based on the prompts and the one or more template parts.

Embodiments relate to systems and methods for generating websites. Methods and systems consistent with the disclosure include a method for generating a website, comprising: receiving, by a computer program executed on an electronic device, a request for a website; parsing, by the computer program, the request into an internal part and an external part; identifying, by the computer program, one or more template parts based on the request; determining, by the computer program, a first prompt to query from a first machine learning engine based on internal information the internal part and a second prompt to query from a second machine learning engine based on the external part; receiving, by the computer program, from the first machine learning engine a first response to the first prompt; receiving, by the computer program, from the second machine learning engine a second response to the second prompt; and rendering, by the computer program, the website based on filling in a first field of the template parts with the first response and filling a second field of the template parts with the second response.

In some embodiments, the method may further comprise determining a template to retrieve and sending a call to a template database for the template. In some embodiments, determining the template to retrieve is based on one or more subjects parsed from the request. In some embodiments, the one or more subjects is used as a search for a database of template to identify the template to retrieve. In some embodiments, the method may further comprise determining the first content to query is based on a match of the first content to an internal database. In some embodiments, the method may further comprise determining the first prompt and the second prompt based on one or more subjects parsed from the request. In some embodiments, the method may further comprise generating an update for the one or more template parts of the rendered website based on an original source update.

Embodiments consistent with the present disclosure include a system comprising one or more processors and one or more storage devices storing instructions that when executed by one or more processors, cause the processor to perform one or more steps of the methods disclosed herein. Embodiments consistent with the present disclosure include a computer processing system, computer, or server, comprising: a memory configured to store instructions such as a non-transitory computer-readable medium; and a hardware processor operatively coupled to the memory for executing the instructions to perform one or more steps of the methods disclosed herein.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
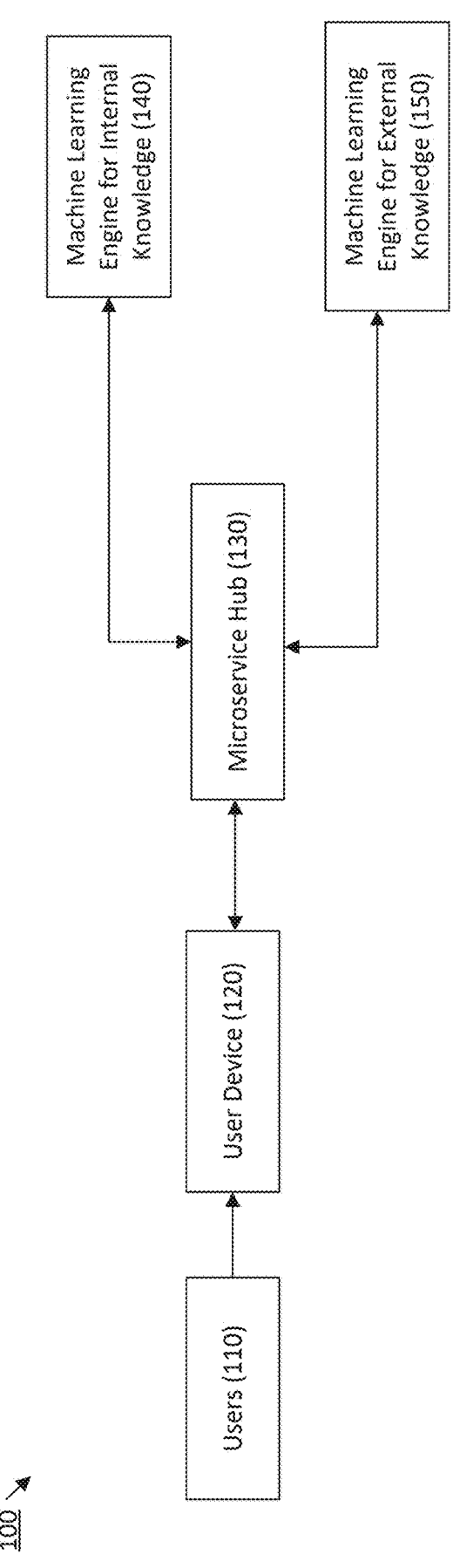
FIG. 1 illustrates a system diagram of a website generation model, in accordance with embodiments.

Embodiments relate to systems and methods for generating websites using disparate data sources.

Prior art systems used frontend and backend servers that communicate with manually-created content delivery websites and manually-created internal content websites. Such systems would use at least five servers, databases, and sites and double that for redundancy. Such systems would also use a significant number of personal for manual entry of data for each created web page, repeated for hundreds of web pages. The volume of web pages makes updates and compliance difficult as well. Further, data is stored in central repositories, creating opportunities for attacks.

Embodiments consistent with the present disclosure reduce or eliminate the requirement for the large number of systems and personnel by providing a microservice with the ability to preprocess and postprocess data for and from specific machine learning engines that achieve content creation. A platform consistent with disclosed embodiments may support four microservice hubs, four first machine learning engines for internal information, and four second machine learning engines for external information, and potentially replace at least sixteen web designer and/or maintenance personnel. Disclosed systems also leverage different instances of webpages that can be generated on demand, producing better and more targeted content than traditional intranet webpages. The ability to use existing internal and external data sources for website content allows this reduction in the large number of systems and persons to create content manually. The benefits of the disclosed platform also include a reduced risk of data breaches because no data is stored on a server or a central repository, which creates a risk of attacks. Instead, the disclosed platform includes pulling data from original data sources for instances created for each website request, and thus reduces or eliminates updating and compliance requirements.

The benefits of disclosed embodiments also include protection against malware attacks because the produced websites are intended for short lifespans and will thus create a smaller window for attackers to find exploits. As noted about, central depositories or server-based pages create an attractive target for attackers who only need access once to disrupt the intranet system or the internal network, and thus the disclosed embodiments avoid such avenues for attack by relying on dispersed data sources. The proposed platform may also include increased privacy because each site is unique and no personal or confidential information needs to be stored in the central repositories or server. The proposed platform may also require less personal information by reducing inconsistencies and/or gaps in security protections.

Consistent with the present disclosure, a microservice hub may receive a request for a webpage. The microservice hub may return a generated webpage (e.g., using html language). The request for the webpage may include a user entry, a socket call, or a representational State Transfer (REST) call. The user entry may be received by a call generated by a user input into a browser search bar or address bar. The user entry may be received by a graphical user interface of an application or a webpage in operable connection with the microservice hub. In some embodiments, the request for the webpage may be received as an external request or an API call. The socket call or the REST call may be automated. The socket call or REST call may be accessible through a webpage, which may be a webpage generated by the microservice hub. The socket call or REST call may be in an expected format (e.g., JavaScript Object Notation (JSON)).

In response to the request for the webpage, the microservice hub may gather template parts, compile a template, render a website, and identify and request site data. The microservice hub may create and send prompts to a first machine learning engine for internal information. The microservice hub may receive internal data for the website in response. The microservice hub may create and send prompts to a second machine learning engine for external information. The microservice hub may receive external data for the website in response. The website may include several web pages, each web page rendered by the microservice hub.

Embodiments may provide customizability and efficiency through the use of templates as a starting point for the microservice hub to use for generating a website or a web page with the internal and/or external data.

Referring to FIG. 1, a system 100 of a personalized intranet website generation model is illustrated, in accordance with embodiments.

The system 100 may include users 110 sending requests through user device 120, where a website is accessible. The user device 120 may be a computer or electronic communication device. In some embodiments, the user device 120 may access an interface for communication with a microservice hub 130, the interface being a browser or application. The microservice hub may be a computer program consistent with disclosed embodiments. In some embodiments, the user device 120 may send a request for a webpage through an address bar. Microservice hub 130 may communicate with user device 120 to determine a user request or narrow the user request. Microservice hub 130 may narrow the request by generating a call for a user profile associated with user device 120 or an account associated with the browser or application. Microservice hub 130 may narrow the request by referencing an association of the user profile with an intranet entity.

Microservice hub 130 may parse the request, including a text or a formatted request consistent with disclosed embodiments, into a first prompt for a first machine learning engine for internal information 140 and a second prompt for a second machine learning engine for external information 150. Microservice hub 130 may determine the first prompt for the first machine learning engine by matching one or more words or phrases of the request with an internal database including references to one or more words or phrases. Based on if matches are made or a threshold number of matches are made, the prompt for the first machine learning engine may include words or phrases weighted to prioritize the match or a larger number of matches.

Internal information may be stored on an internal database and be relevant to an organization. Internal information may be related to an organization's work or work product. For example, if an organization's field of work is information technology, internal information may be sales of computer services, assets in-work, a number of man-hours, mean-time-to-failure of units, or any other work-related organization information. In some embodiments, internal information may be proprietary including processes, unpublished data, and so on.

External information may be stored on an external database. External information may be accessible through an internet or other data connection from an organization's network. External information may or may not be relevant to the organization's work or work product.

In some embodiments, microservice hub 130 may use a work type (e.g., an occupation such as legal, financial, entertainment, research, based on a field of study, etc.) of the user or an organizational division (administration, sales, management, etc.) of the user in the prompt. Microservice hub 130 may determine the second prompt for the second machine learning engine by weighting words or phrases to prioritize words that were not matched with the first learning engine or had a lower number of matches. In some embodiments, the first prompt and second prompt may be the same.

Phrases of the request may be identified by a natural language processing engine.

Machine learning engines 140, 150 may return content consistent with the first and second prompts, respectively. The microservice hub 130 may combine the content with a template and render a website and responds with the website to the user device 120, consistent with disclosed embodiments. Machine learning engines 140, 150 may be trained on the internal or external data, respectively, as well as a user profile, to be able to generate a website based on prompts. The machine learning engines 140, 150 may be trained by being provided data from a known dataset so the model can learn from the data and thus be able to generate the website. The machine learning engines 140, 150 may fit an algorithm to the provided data to generate the website. When unknown internal or external data is introduced, machine learning engines 140, 150 may apply the algorithm to generate the website. This process will be described further below. The machine learning engines 140, 150 may each include a dimensional data model that uses a flexible query language.

Figure 2:
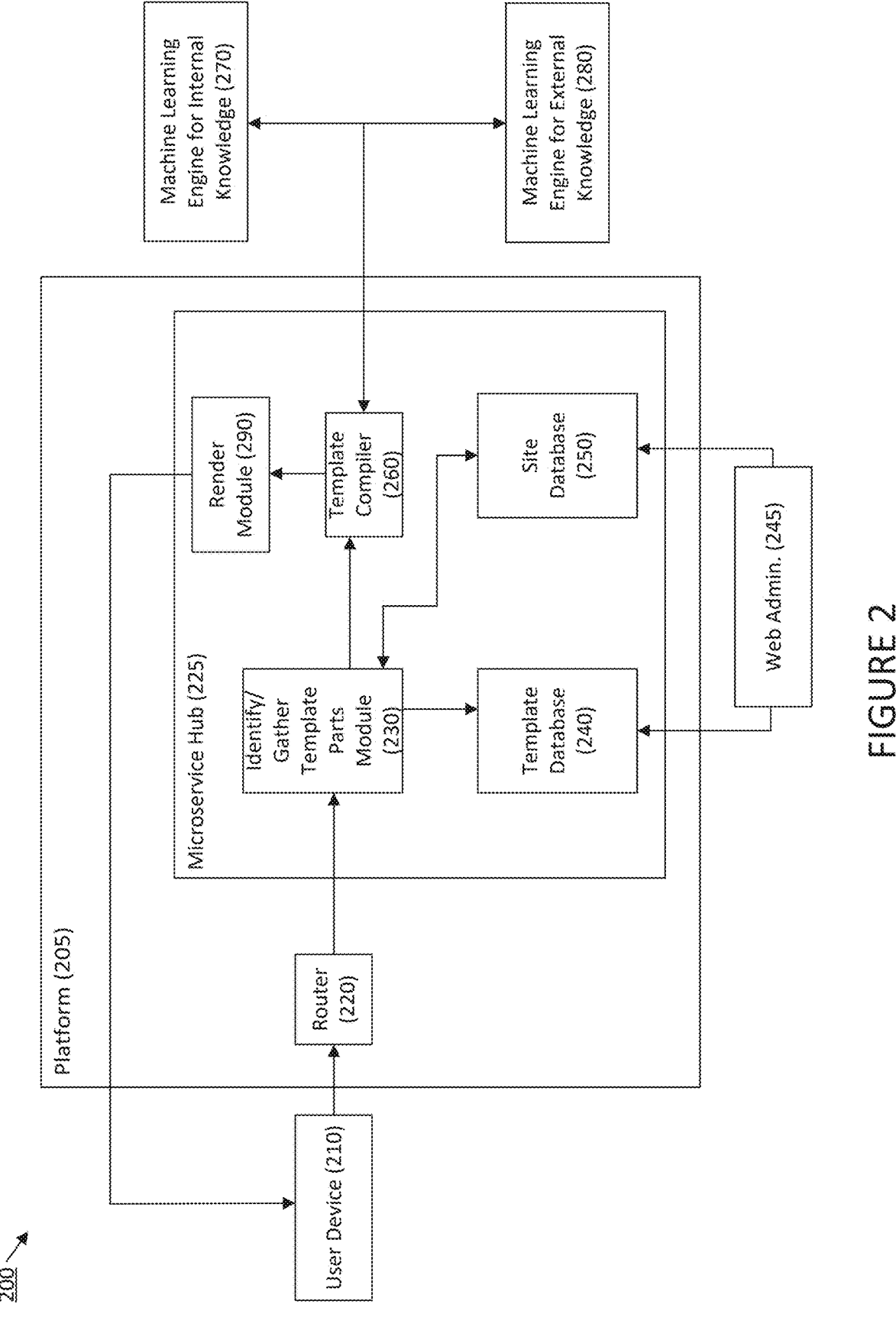
FIG. 2 illustrates a system diagram of a website generation model, in accordance with embodiments.

Referring to FIG. 2, a block diagram of a system 200 for generating a personalized intranet website is illustrated, in accordance with embodiments. The system 200 may include user device 210 providing requests to a router 220 within a platform 205 capable of providing a website. Platform 205 may be a server, computer, or computer network. Platform 205 may include microservice hub 225. Router 220 may provide the request for a website to the microservice hub 225.

Microservice hub 225 may include gather and identify template parts module 230. Gather and identify template parts module 230 may retrieve parts of a template based on the request. In some embodiments, some template parts may be assumed as necessary. In other embodiments, a table may be referenced for a list of likely template parts to use for the website generation based on the request. The request may be any request discussed above. Once the template parts are gathered, a list of template parts may be generated and stored for the request.

Module 230 may select template parts based on a model webpage, previous webpages produced for similar request, and/or the request and the user profile. In some embodiments, module 230 may identify a template part for each word or phrase of the request.

Module 230 may fetch a requested template or template part from a template database 240 upon identification. The template database 240 may return the requested template or a template determined to be similar in response. Similarity of templates may be determined by semantic similarity of the word or phrases being used by module 230 to identify the template part. Where no similarity may be determined, a default template may be provided.

Each template of template database 240 may include one or more of sections for navigation menus, sliders, text, images, lists, links, headers, graphical user interfaces, and footers.

The template database 240 may receive updates from a web administrator 245. Module 230 may fetch site specific data from a site database 250. Site database 250 may return the requested site data. Site data may be specific to an intranet entity including divisional organizations, business units, personal files, or any other information discussed above.

Module 230 may send the requested template parts to template compiler 260. The template compiler 260 may receive a list of template parts or a file referencing a location of selected template parts, and the template compiler 260 may convert the input into machine code or an assembly language.

Template compiler 260 may provide compiled templates to machine learning engines 270, 280. The template compiler 260 may request data for the template or identified template parts in lower-language form from the machine learning engines 270, 280. Machine learning engines 270, 280 may return data based on the data request for the template compiler 260 to fill a template, including each template part, where each template part may include one or more fields that are linked to and based on internal or external data determined by the machine learning engines 270, 280, respectively. Machine learning engines 270, 280 may identify internal or external data based on prompts as discussed above.

Template compiler 260 may forward the compiled and fulfilled template to render module 290. Render module 290 may return the generated website to the user device 210 once it has compiled template parts including the internal, external, and site data. An update module (not shown) may track original sources for the internal and external data. The update module may track updates to original sources and then call render module 290 to render an updated website with the updated internal, external, and site data.

System 200 may generate a website for each request, resulting in a different website each time a user request is received because of predictions made by machine learning engines 270, 280.

Figure 3:
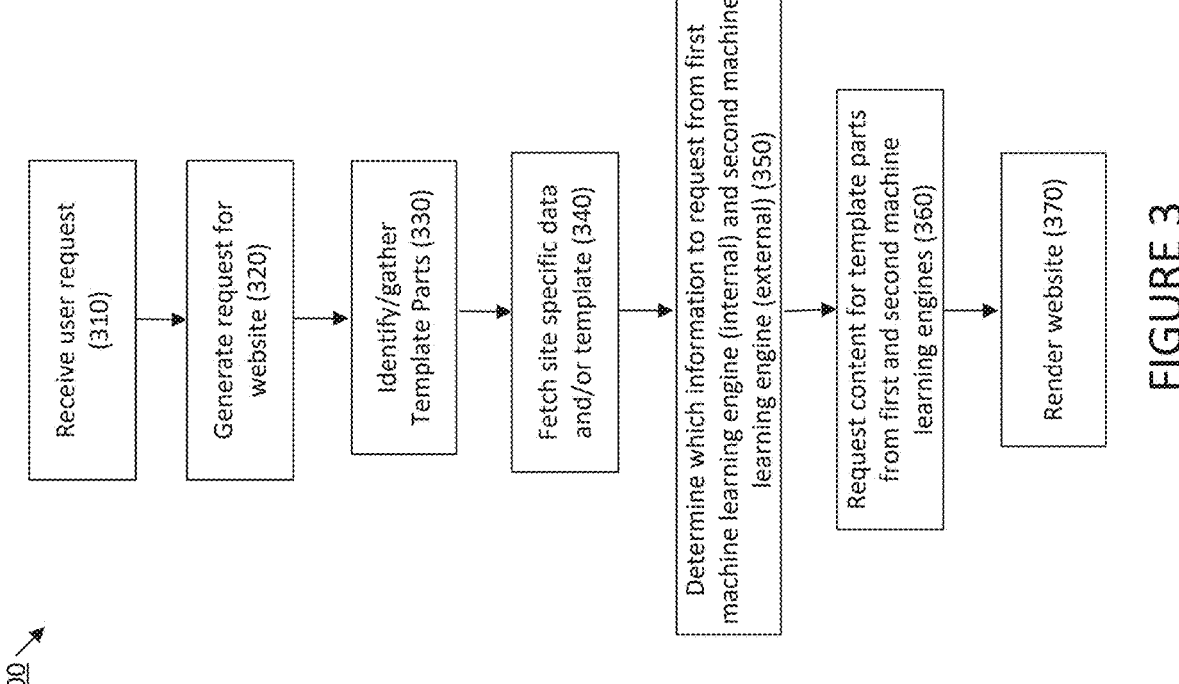
FIG. 3 illustrates a process diagram of a dataset transfer management process, in accordance with embodiments.

FIG. 3 illustrates a data management and movement process 300 according to some embodiments. Depending on the implementation, the process 300 may be in the form of instructions executed by a processor.

In step 310, a server hosting a website generation platform may receive a request for web page. The request may be any request discussed above. In some embodiments, the request may be a webpage call through an address bar of a web browser accessed through a user device.

In step 320, the website generation platform may generate a parsed request for a website based on the request. The parsed request may be generated by detecting an internal part of the request as compared to an external part of the request, as discussed above. The internal part may be determined by matching one or more words or phrases of the request with an internal database including references to one or more words or phrases. Based on if matches are made or a threshold number of matches are made, the prompt for the first machine learning engine may include words or phrases weighted to prioritize the match or a larger number of matches. In some embodiments, the website generation platform may use a work type (e.g., an occupation such as legal, financial, entertainment, research, based on a field of study, etc.) of the user or an organizational division (administration, sales, management, etc.) of the user to determine an internal part by matching the work type or organizational division to the request. The external part may be determined by matching one or more words or phrases of the request with an internal database and/or weighting words or phrases to prioritize words that were not matched with the first learning engine or had a lower number of matches. The parsed request may include additional details added to the request. The additional details may include an identification of the requester, the requester's type of work or organization, In some embodiments, the website generation platform may parse the request into words or phrases, which can be determined by a natural language processing engine, that identify separate portions of the request. The words or phrases may be compared to a database of words or phrases of past requests.

In step 330, an identifying and gathering template parts module of the website generation platform may use the parsed request to identify one or more template parts for the requested website. Template parts may, taken together, make up a website page when the template parts are filled with content specific to each template part. Identifying template parts may be based on the type of content to be displayed for each template part. For example, a template part may include a profile of a person identified in the request and may include a picture, a biographical detail, contact information, and/or a type of work. The data used for each field (e.g., a picture, a biographical detail, etc.) may be requested from a site specific database and/or an internal or external machine learning engine, discussed further below. As another example, a template part may include a set of frequently asked questions and answers about a topic of the request, where each question or answer may be a field. As another example, a template part may include a picture or meme related to the request, a summary related to the request, a link from an original source, a schedule, an outline that may include a link for each bullet point, and a statistic related to the request.

In some embodiments, the user request may be compared to past user requests for a complete list of template parts or a base or starter set of template parts. The complete list may include all of template parts to be used in response to the request. The base or starter set of template parts may include a minimum set of template parts. For example, the base or starter set may include at least one template part used for internal information and at least one template part used for external information to provide internal and external perspectives of the request to the user. In some embodiments, the number of template parts may be equivalent to a number of the identified separate parts of the request. For example, a template part may be identified for each part of the parsed request.

In step 340, the website generation platform may identify and request site specific data for website generation and/or to fill in portions of each template part. The site specific data may include a profile of the user stored on a local database. The site specific data may include data of an organization or a local facility of the organization including an organizational chart (e.g., showing a position hierarchy at the organization), a building and functionalities associated with the building (e.g., information technology, type of inputs or outputs). As an example of identifying and requesting site specific data for website generation, a template part may be based on the profile of the user's relationship to the request. The platform may identify and retrieve site specific information for the template part to fill the template. For example, the request may be for a product, and the template part may include one or more fields related to the user and the user's experience with the product within the organization, and the platform may retrieve data from the site specific data related to the user and/or the product. The one or more fields may be a default, blank, or empty data entry point. The data entry point may be used to input characters, images, or links. Further, the website generation platform may request an identified template based on the portion of the user request requiring site specific data. For example, if a person forms a part of the request, and the person is found to be working for the intranet entity, then site specific data may be found to fill in a template relevant to the person. Similarly, site specific data may be found for affiliated, associated, or known persons, companies, locations, organizational divisions (e.g., business units), products, or services.

In step 350, the website generation platform may determine a first prompt for a first machine learning engine based on whether the information is internal and a second prompt for a second machine learning engine based on whether the information is external. The determination of internal information versus external information may be made based on subject matter, a relationship to company personnel or business, or a quantity of search returns when searching an internal database versus externally (e.g., the internet, an external database) for a word or phrase. The determination of internal versus external may be based on other methods discussed above.

For example, the first prompt may be related to an organization's work or history with a particular product, where the particular product was named or referenced in the request and where the organization is the intranet entity operating the website generation platform. The second prompt may be based on the particular product's sales statistics, user reviews, price, or other data found on external data sources. The first and second prompts in this example may be the same prompt, but as discussed above, the request may be parsed and separate prompts may be used. For example, if the request included "respond to customer asking about product work-from-home," the first prompt may include the user's type of work and/or background and include 'responses to customers about product' or similar, and the external prompt may include the product and/or the product being used while working-from-home. Once each prompt has been determined, each prompt may be input into the machine learning engines to identify and retrieve content for a template part.

In step 360, the website generation platform may combine the template parts and one or more responses to the prompts from the machine learning engines. The platform may request data for the template or identified template parts in lower-language form from the machine learning engines. Machine learning engines may return data based on the data request to fill a template, including each template part, where each template part may include one or more fields that are linked to and based on internal or external data determined by the machine learning engines. The platform may fill the fields, so as to fill each template part, with responses from the machine learning engines. As discussed above, the one or more fields may be a default, blank, or empty data entry point. The data entry point may be used to input characters, images, or links. In some embodiments, the platform may organize website code by applying data and/or a link for data for each field.

In step 370, the website generation platform may render the website for display and interfacing on a user device. Rendering the website may include converting website code into viewable, interactive web content for a browser to display. Where the website code includes template parts, data for one or more fields of the template parts, the platform may render the code into a displayable web content. For example, where the site specific data is a user profile and internal information are frequently asked questions related to a product, a first template part with the user profile and a second template part with the frequently asked questions may be converted from code to a webpage displaying the template parts with the data for the one or more fields of the template parts. The displayable web content may be viewable by the user on an electronic communication device. Rendering may also include generating one or more user interfaces such as links, buttons, slide bars, and so on.

Rendering may include interpreting the website code written in any code language, including JavaScript frameworks, and displaying it as a webpage that users can interact with. For example, rendering may include receiving a website code including a <b> tag and outputting bold text. In some embodiments, the rendering may be accomplished by the website generation platform. In other embodiments, the code may be provided to a frontend application for rendering on a user device. In some embodiments, the webpage may be generated as a single instance that is no longer available when the user closes out of the instances (i.e., exits the instance).

Figure 4:
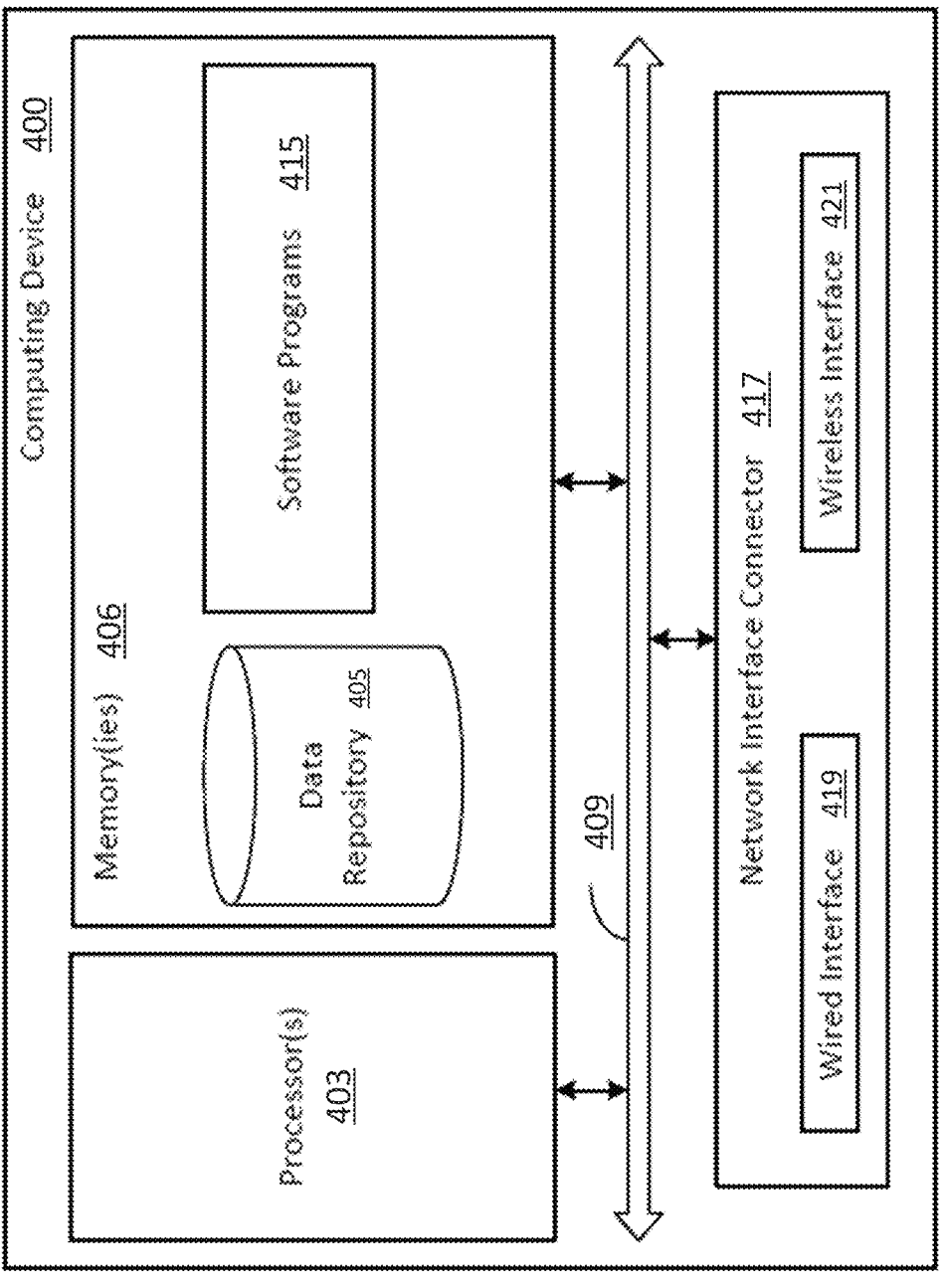
FIG. 4 illustrates a block diagram of a computing device for implementing certain embodiments of the present disclosure.

FIG. 4 is a block diagram of a computing device for implementing certain embodiments of the present disclosure. FIG. 4 depicts exemplary computing device 400. Computing device 400 may represent the system components described herein. Computing device 400 may include processor 403 that may be coupled to memory 406. Memory 406 may include volatile memory or a non-transitory computer readable medium. Processor 403 may execute computer-executable program code stored in memory 406, such as software programs 415. Software programs 415 may include one or more of the logical steps disclosed herein as a programmatic instruction, which may be executed by processor 403. Memory 406 may also include data repository 405, which may be nonvolatile memory for data persistence. Processor 403 and memory 405 may be coupled by bus 409. Bus 409 may also be coupled to one or more network interface connectors 417, such as wired network interface 419 or wireless network interface 421. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method executed by a processor of one or more computers, the method comprising:

receiving, by a computer program executed on an electronic device, a request for a website;

parsing, by the computer program, the request into an internal part and an external part;

identifying, by the computer program, one or more template parts based on the request;

determining, by the computer program, a first prompt to query from a first machine learning engine based on internal information the internal part and a second prompt to query from a second machine learning engine based on the external part, wherein determining the first prompt comprises matching one or more words or phrases of the request to entries of an internal database and weighting matched words or phrases based on a number of matches and user-specific attributes including a work type or organizational division, and wherein determining the second prompt comprises weighting words or phrases not matched to the internal database or having fewer matches;

receiving, by the computer program, from the first machine learning engine a first response to the first prompt;

receiving, by the computer program, from the second machine learning engine a second response to the second prompt; and rendering, by the computer program, the website based on filling in a first field of the template parts with the first response and filling a second field of the template parts with the second response, wherein each field of the template parts is linked to and based on internal data determined by the first machine learning engine or external data determined by the second machine learning engine, wherein the website is generated as a single instance that is no longer available when a user exits the instance and wherein a different website is generated for each received request due to predictions by the first machine learning engine and the second machine learning engine.

2. The method of claim 1, further comprising determining a template to retrieve and sending a call to a template database for the template.

3. The method of claim 2, wherein determining the template to retrieve is based on one or more subjects parsed from the request.

4. The method of claim 3, wherein the one or more subjects is used as a search for a database of template to identify the template to retrieve.

5. The method of claim 1, wherein determining the first prompt to query is based on a match of the first prompt to an internal database.

6. The method of claim 1, further comprising determining the first prompt and the second prompt based on one or more subjects parsed from the request.

7. The method of claim 1, further comprising generating an update for the one or more template parts of the rendered website based on an original source update.

8. A computer processing system comprising:

a memory configured to store instructions; and a hardware processor operatively coupled to the memory for executing the instructions to:

receive a request for a website;

parse the request into an internal part and an external part;

identify one or more template parts based on the request;

determine a first response to query from a first machine learning engine based on internal information the internal part and a second response to query from a second machine learning engine based on the external part, wherein determining the first prompt comprises matching one or more words or phrases of the request to entries of an internal database and weighting matched words or phrases based on a number of matches and user-specific attributes including a work type or organizational division, and wherein determining the second prompt comprises weighting words or phrases not matched to the internal database or having fewer matches;

receive from the first machine learning engine a first response to the first prompt;

receive from the second machine learning engine a second response to the second prompt; and render the website based on filling in a first field of the template parts with the first response and filling a second field of the template parts with the second response, wherein each field of the template parts is linked to and based on internal data determined by the first machine learning engine or external data determined by the second machine learning engine, wherein the website is generated as a single instance that is no longer available when a user exits the instance and wherein a different website is generated for each received request due to predictions by the first machine learning engine and the second machine learning engine.

9. The system of claim 8, the instructions further comprising determining a template to retrieve and sending a call to a template database for the template.

10. The system of claim 9, wherein determining the template to retrieve is based on one or more subjects parsed from the request.

11. The system of claim 10, wherein the one or more subjects is used as a search for a database of template to identify the template to retrieve.

12. The system of claim 8, wherein determining the first response to query is based on a match of the first response to an internal database.

13. The system of claim 8, the instructions further comprising determining the first prompt and the second prompt based on one or more subjects parsed from the request.

14. The system of claim 8, the instructions further comprising generating an update for the one or more template parts of the rendered website based on an original source update.

15. A non-transitory computer readable storage medium, including instructions stored thereon, which when read and executed by one or more computer processors, cause the one or more computer processors to perform steps comprising:

receiving a request for a website;

parsing the request into an internal part and an external part;

identifying one or more template parts based on the request;

determining a first response to query from a first machine learning engine based on internal information the internal part and a second response to query from a second machine learning engine based on the external part, wherein determining the first prompt comprises matching one or more words or phrases of the request to entries of an internal database and weighting matched words or phrases based on a number of matches and user-specific attributes including a work type or organizational division, and wherein determining the second prompt comprises weighting words or phrases not matched to the internal database or having fewer matches;

receiving from the first machine learning engine a first response to the first prompt;

receiving from the second machine learning engine a second response to the second prompt; and rendering the website based on filling in a first field of the template parts with the first response and filling a second field of the template parts with the second response, wherein each field of the template parts is linked to and based on internal data determined by the first machine learning engine or external data determined by the second machine learning engine, wherein the website is generated as a single instance that is no longer available when a user exits the instance and wherein a different website is generated for each received request due to predictions by the first machine learning engine and the second machine learning engine.

16. The non-transitory computer readable storage medium of claim 15, the steps further comprising determining a template to retrieve and sending a call to a template database for the template.

17. The non-transitory computer readable storage medium of claim 16, wherein determining the template to retrieve is based on one or more subjects parsed from the request.

18. The non-transitory computer readable storage medium of claim 17, wherein the one or more subjects is used as a search for a database of template to identify the template to retrieve.

19. The non-transitory computer readable storage medium of claim 15, wherein determining the first response to query is based on a match of the first response to an internal database.

20. The non-transitory computer readable storage medium of claim 15, the steps further comprising generating an update for the one or more template parts of the rendered website based on an original source update.

* * * * *